United States Patent
Mills et al.

(10) Patent No.: US 6,188,538 B1
(45) Date of Patent: Feb. 13, 2001

(54) RETRY OFF-TRACK POSITIONING TABLE

(75) Inventors: Mark E. Mills, Loveland, CO (US); John L. Moore, Solvang, CA (US)

(73) Assignee: Hewlett Packard Company, Palo Alto, CA (US)

( * ) Notice: Under 35 U.S.C. 154(b), the term of this patent shall be extended for 0 days.

(21) Appl. No.: 09/100,438

(22) Filed: Jun. 19, 1998

(51) Int. Cl.$^7$ ................................................. G11B 5/596
(52) U.S. Cl. ................................. 360/77.04; 369/53.37; 714/15; 714/710
(58) Field of Search .......................... 369/54; 360/77.04, 360/77.12, 77.13; 714/15, 710; 702/179, 180

(56) References Cited

U.S. PATENT DOCUMENTS

| | | | |
|---|---|---|---|
| 4,725,968 | * 2/1988 | Baldwin et al. | 360/31 X |
| 5,353,172 | * 10/1994 | Alioth | 360/70 |
| 5,721,816 | * 2/1998 | Kusbel et al. | 360/77.04 X |
| 5,835,299 | * 11/1998 | Lee et al. | 369/54 X |
| 5,969,895 | * 6/2000 | Ueda et al. | 360/77.04 X |
| 6,008,962 | * 12/1999 | Le et al. | 360/77.04 X |
| 6,078,454 | * 6/2000 | Takahashi et al. | 360/66 |

* cited by examiner

Primary Examiner—Aristotelis M. Psitos

(57) ABSTRACT

An improved heroic data recovery technique in which the inventive mechanism initially calibrates data storage devices' read/write mechanism misalignment characteristics and then reduces such calibration to an off-track positioning table. The table reflects a histogram indicating statistically where the misalignment is most likely to be found based on measurement of the characteristics of the device. The device's off-track positioning mechanism uses this table to execute a series of off-track read attempts in statistical order of likelihood of recovering unreadable data. The read head moves first to the off-track position in the table where statistically the misalignment is most likely to be found, and then to the next most likely, and so on, until the data is either found and recovered, or the series embodied in the table is exhausted. If the table becomes exhausted, an alternative heroic technique must be applied.

16 Claims, 2 Drawing Sheets

| | | |
|---|---|---|
| 402 ↓ | | 401U |
| + 12 | 9 | |
| + 11 | 15 | |
| + 10 | 23 | |
| + 9 | 7 | |
| + 8 | 19 | |
| + 7 | 3 | |
| + 6 | 17 | |
| + 5 | 1 | |
| + 4 | 13 | |
| + 3 | 11 | |
| + 2 | 5 | |
| + 1 | 21 | 401C |
| − 1 | 22 | |
| − 2 | 6 | |
| − 3 | 12 | |
| − 4 | 14 | |
| − 5 | 2 | |
| − 6 | 18 | |
| − 7 | 4 | |
| − 8 | 20 | |
| − 9 | 8 | |
| − 10 | 24 | |
| − 11 | 16 | 400 |
| − 12 | 10 | 401L |

RETRY OFF-TRACK POSITIONING TABLE

TECHNICAL FIELD OF THE INVENTION

This invention relates generally to heroic techniques in the recovery of unreadable data stored previously on mass data storage devices, and more specifically to executing a series of off-track reading attempts in accordance with prior measurement of off-track error characteristics of specific data storage devices.

BACKGROUND OF THE INVENTION

In the art of mass data storage, it is to be expected that occasionally stored data becomes unreadable on the medium on which it is stored. A common reason for the data becoming unreadable is that the write mechanism loses correspondence with the read mechanism. When this happens, although the data as stored may have full integrity, the read mechanism is simply unable to retrieve the data as stored, since the write mechanism has deposited the data on the medium in a different location from the location where the read mechanism expects to find it.

Standard algorithmic data recovery techniques such as Error Correction Code ("ECC") are typically unable to recover data lost in this way. Since the read and write mechanisms are out of correspondence, there is generally too much data missing for ECC to recover mathematically. In such cases, heroic data recovery techniques must be resorted to. Off-track positioning is the primary heroic technique used to recover data suspected to be lost through loss of correspondence between read and write mechanisms. If off-track positioning fails, the success of other heroic techniques such as modifying read channel characteristics (read bias, filter boost, etc.) or re-tensioning the tape (in the case of tape data storage) becomes very unpredictable.

Standard off-track positioning techniques typically employ a predetermined sequence of read track adjustment steps where, starting at the track centerline (where the data is expected), the read head is displaced in successively larger off-track distances symmetrically either side of the centerline until the data is discovered. This methodology assumes that the small misalignments between read and write mechanisms are more likely to occur than large misalignments in every case.

This "centerline increment" approach is flawed for at least two reasons. First, the forces that actually work to produce read/write mechanism misalignment include contributions from conditions where a large misalignment may be just as likely as a small misalignment. For example, a primary cause of misalignment is a "wander" between write head and storage medium. This "wander" is just as likely to be large as small, depending on the effects that are causing it. The "wander" may, however, be measured and subsequently predicted with some accuracy according to particular characteristics of the data storage device.

Second, the "centerline increment" approach tends to magnify the effect of hysteresis inherent in the reciprocal movement of the read head. Most read head mechanisms employ meshing worm gears to enable small but repeatably accurate displacements across the storage medium. Slight imperfections (or normal wear and tear) in the gear profiles cause "gear lash", where, over time, "slop" in the gears diminishes the actual displacement of the read head for a given rotation of the drive worm gear. This hysteresis effect is generally optimized by biasing the meshing worm gears, normally with a spring. Nonetheless, this hysteresis effect always tends to have the most impact on small movements of the read head.

The hysteresis effect is thus magnified in the "centerline increment" approach to off-track positioning, since the approach starts with small displacements either side of the centerline, and progresses to larger increments (where hysteresis may have a less pronounced effect) only when small displacements have failed to retrieve the data. Indeed, under the "centerline increment" approach in a device where hysteresis is pronounced, the off-track positioning mechanism may not actually move the read head off the track centerline for several consecutive incremental off-track read attempts. In such cases, the time to recover data via off-track positioning is clearly extended.

There is therefore a need in the art to conduct data recovery via off-track positioning in accordance with predictable misalignment characteristics of the storage device rather than by some arbitrary approach such as "centerline increments". It would be further advantageous if improved off-track positioning techniques minimized the effect of hysteresis in the read head mechanism.

SUMMARY OF THE INVENTION

These and other objects, features and technical advantages are achieved by a system and method which initially calibrates data storage devices' read/write mechanism misalignment characteristics and then reduces such calibration to an off-track positioning table. The table is based on a statistical distribution indicating where the misalignment is most likely to be found, from the most likely off-track location down to the least likely, based on measurement of the characteristics of the device. The off-track positioning mechanism uses this table to execute a series of off-track reading attempts in statistical order of likelihood in recovering unreadable data.

In a preferred embodiment, the read head moves off-track first to one side of the centerline, to the off-track position in the table where statistically the misalignment is most likely to be found. The read head then tries to recover data from there. If no data is found, the read head moves to the corresponding off-track position on the other side of the centerline. If no data is found on the other side, then the read head switches track position in the table in statistically the second-most likely place. If this read yields no data, then the read tries at the corresponding off-track position on the other side of the centerline. The process continues until either the data is found and recovered, or the series of offsets embodied in the table is exhausted. If the table is exhausted, then off-track data recovery was unsuccessful, and an alternative heroic technique must be applied.

Note that the preferred embodiment uses symmetric off-track positioning, as described immediately above, in order to take advantage of proximity characteristics expected to be exhibited by "sequential" storage devices such as tape drives. It will be appreciated, however, that the invention is broader in concept, and is not limited to symmetric off-track positioning either side of the track centerline. Operators of ordinary skill in the art will know when proximity is likely to be a factor, as may vary from one type of storage device to another. Such operators will then apply the invention in conjunction with proximity considerations when appropriate.

When proximity is not a consideration, the invention may be implemented in its broader form, in which a table is developed representing the statistical likelihood of finding off-track data without regard to the track centerline. In such an alternative embodiment, the statistical priorities established by the inventive table may call for a series of off-track read attempts that moves from one position to the next anywhere within the sampled off-track position spectrum.

It is therefore a technical advantage of the present invention to use off-track positioning to recover data in accordance with the read/write mechanism misalignment characteristics of the data storage device, rather than an arbitrary method such as "centerline increments" as described in the previous section. As a result of correlating off-track data recovery to predictable misalignment characteristics, rapid data recovery becomes more attainable.

It is a further technical advantage of the present invention to minimize the effect of hysteresis in the read head mechanism when implementing off-track positioning data recovery techniques. Because the distances traveled by the read head in following the sequence of off-track read attempts according to the inventive positioning table tend to be irregular, the effect of hysteresis tends to have a less pronounced impact on accurate movement of the read head mechanism.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 depicts an exemplary implementation of table 300 in FIG. 3 during off-track read attempts on tape data track 400.

DETAILED DESCRIPTION OF THE INVENTION

The invention will be described in detail with reference to a preferred embodiment in which an inventive off-track positioning table is implemented on a tape-driven mass data storage device. It will be appreciated, however, that the invention is broad in concept, and is not limited to tape drive embodiments. The inventive off-track positioning table may be implemented equally well in any data storage application in which read/write mechanisms and data storage media move relative to each other. For example, the medium may be rotational in configuration (such as a cylinder or a platter), or it may be sequential (such as a tape). So long as data written off-track on the medium is susceptible to being recovered by making selected corresponding off-track read attempts, the inventive off-track positioning table may be utilized to improve the data recovery efficiency of such off-track read attempts.

It will be further appreciated that, as described above in the previous section, the preferred embodiment makes symmetric off-track reads either side of the track centerline so as to take advantage of proximity considerations inherent in the misalignment characteristics expected in a sequential storage device such as the tape drive of the preferred embodiment. As noted above, though, the inventive off-track positioning table is not limited to such symmetric off-track reads, which are used in the preferred embodiment only because they are appropriate in view of the exemplary tape storage device used in a preferred embodiment. An alternative embodiment will be described summarily below wherein off-track reads are made without regard to the track centerline, and so therefore appear completely asymmetric about the track centerline.

Figure 1:
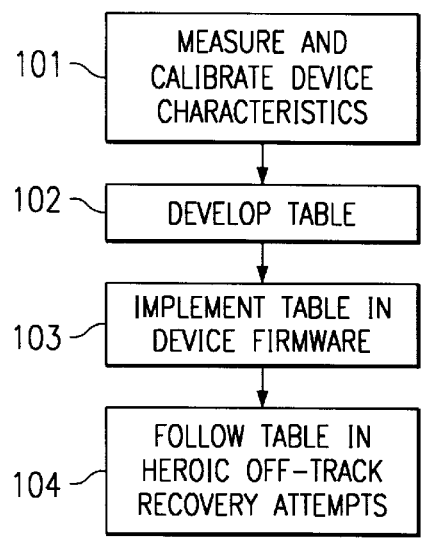
FIG. 1 is a flow chart illustrating recovering data in accordance with the present invention.

With reference to FIG. 1, the first stage of recovering the data in accordance with the inventive off-track positioning table is to calibrate the read/write mechanism misalignment characteristics of the data storage device on which it is to be implemented (block 101). It will be appreciated that these characteristics will vary from one storage device type to another, and even among storage devices of the same type. As noted, for example, it may be advantageous to implement the invention in conjunction with proximity considerations. Those of ordinary skill in this art, however, may be expected to already understand and identify the individual read/write mechanism misalignment characteristics of the various storage devices on which they may wish to implement the inventive off-track positioning table, and to select and apply them accordingly. For example, in the tape drive storage device of the preferred embodiment, it is well understood that tape "wander" may occur perpendicular to the direction of travel of the tape as the tape is unwound from one reel and wound onto the other reel. It is further well understood that such "wander" is generally cyclic and tends to be more pronounced at the end of a tape than at the beginning. Additional effects well understood in the tape drive devices to contribute to loss of correspondence between read and write mechanisms include variation in tape tension (tape tends to be tighter near the beginning than at the end), variation of the attitude at which the tape addresses the read/write head as the tape passes from one reel to another, and thermal expansion effects.

It will therefore be appreciated that operators of ordinary skill in the art will know which read/write mechanism misalignment characteristics to measure and calibrate for the particular device. Calibration is enabled by monitoring the misalignment behavior of the read/write mechanisms for a suitable sample of naturally-occurring data, and charting a statistical representation of the distribution of the off-track repositioning required to recover the data sample completely. The distribution then allows specific off-track read positions to be ranked according to the statistical probability that the data is likely to be recovered there.

With further reference to FIG. 1, the next stage of recovering data in accordance with the invention is to develop the inventive table (block 102). The table comprises the off-track read positions ranked in order of likelihood that data will be recovered there, from most likely to least likely.

The table is then implemented in the firmware of the device (block 103) and is followed whenever off-track positioning is used by the device to attempt to recover unreadable data (block 104). The device makes off-track read attempts in a series following the table, starting with the off-track read position most likely to find the data, followed by the next most likely, and so on down to the least likely.

Figure 2:
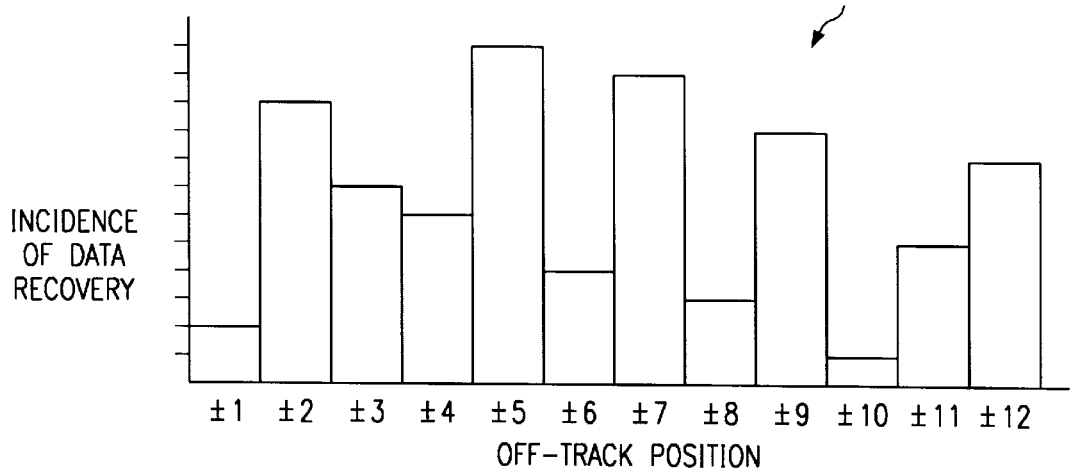
FIG. 2 is a histogram 200 illustrating the results of a hypothetical calibration of an exemplary tape storage device used in a preferred embodiment.

Turning now to FIG. 2, histogram 200 represents a hypothetical calibration of an exemplary tape storage device used in a preferred embodiment of the present invention. Since a tape storage device is being used, the operator wishes to take advantage of proximity effects, and so symmetrical implementation either side of the track centerline will be used. As emphasized at length above, however, other embodiments are possible consistent with the scope of the invention in which such symmetrical implementations are not selected.

With further reference to histogram 200 on FIG. 2, the incidence of data recovery at each off-track position (cumulative incidences for that position either side of the track centerline) is charted to indicate a distribution. From this distribution, table 300 on FIG. 3 can be developed, ranking off-track positions in order of statistical likelihood of recovering data there.

Figure 3:
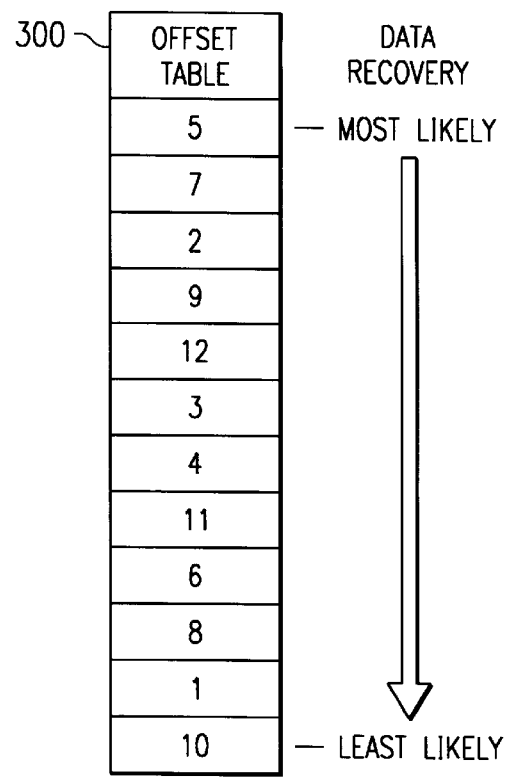
FIG. 3 is a representation of the inventive table 300 developed using histogram 200 in FIG. 2.

FIG. 4 shows table 300 on FIG. 3 implemented on the exemplary tape drive during off-track data recovery. FIG. 4 represents a data track 400 on a tape, 401C being the track centerline, 401U being the upper boundary with the data track above, and 401L being the lower boundary with the data track below. Data track 400 is divided into 24 off-track positions 402, +1 through +12 above track centerline 401C, and −1 through −12 below the track centerline 401C.

Column 403 on FIG. 4 indicates the sequence in which the device will make off-track read attempts in accordance with table 300 on FIG. 3. Since off-track position 5 is at the top of table 300, column 403 shows attempts 1 and 2 at off-track positions +5 and −5, respectively. Positions +7 and −7 are next, followed by positions +2 and −2, and so on until the last attempts are +10 and −10. The off-track read sequence thus follows the misalignment characteristics sampled and calibrated in developing histogram 200 on FIG. 2.

The symmetric implementation on FIG. 4 is self-evident. It will nonetheless be appreciated, without the need for further illustration, that the present invention applies with equivalent enabling effect on embodiments where there is no symmetric implementation (i.e. the incidence of data recovery at each off-track position 402 on FIG. 4 is recorded and distributed independently, instead of cumulatively with the corresponding position on the other side of the track centerline). A histogram is developed similar to histogram 200 on FIG. 2, in which the statistical likelihood of recovering data at each track is charted. This histogram is converted into a corresponding table 300 on FIG. 3, from which an off-track read position sequence can be implemented corresponding to column 403 on FIG. 4. The only difference is that the off-track read sequence in column 403 is likely to be distributed unevenly about track centerline 401C.

The technical advantages as described in the previous section are thus achieved. Off-track data recovery is implemented in a sequence correlated to the misalignment characteristics of the read/write mechanisms of the current device. As a result, data recovery is accelerated. Implementations of the invention in practice have consistently demonstrated at least a 12-fold performance improvement in the time required to recover otherwise unreadable data.

The advantage to minimize the effect of mechanical hysteresis is also achieved. In the embodiment illustrated on FIG. 4, the read head moves the following distances in following column 403 (even though the implementation is chosen to be symmetric): +5, −10, +12, −14, +9, −4, +11, −18 and so on. It will be appreciated that these steps are large and irregular, thus tending to minimize the effect of mechanical hysteresis to degrade data recovery performance.

Similarly, when symmetrical implementation is not selected, the steps taken by the read head will continue to be irregular, merely by the nature of the statistical sampling of individual off-track read positions on an independent basis. Mechanical hysteresis will also be minimized in these implementations.

An exemplary algorithm employing the present invention may comprise the following steps:

(a) recording a set of data on the data track;

(b) detecting instances of data recorded in step (a) becoming unreadable by the device due to the read head not tracking the data as recorded on the data track;

(c) performing selected off-track reads so as to recover the unreadable data detected in step (b), each off-track read performed at an off-track position in a spectrum thereof across the data track;

(d) for each off-track position in the spectrum, counting the number of times that data is recovered from that off-track-position during step (c);

(e) ranking off-track positions into a series corresponding to incidents of data recovery counted in step (d), the series in order of the off-track position having most incidents down to the off-track position having least incidents;

(f) embodying the series in a table;

(g) loading the table into firmware on the device; and (h) following the table in future off-track read attempts by the device to recover unreadable data.

Other embodiments of the invention are also possible. Since the tables are implemented in firmware on each device, they may be periodically updated as new statistical findings are made. For example, a new type of storage medium may be recommended for use with the device, such as a new CD or tape cartridge, having improved read/write mechanism alignment characteristics. Consistent with the present invention, new off-tracking positioning tables will be advantageously be loaded into the device's firmware. Alternatively, further research and development may be done on existing tables to enhance data recovery efficiency, requiring updating of such existing tables previously implemented in firmware.

Although the present invention and its advantages have been described in detail, it should be understood that various changes, substitutions and alterations can be made herein without departing from the spirit and scope of the invention as defined by the appended claims.

We claim:

1. A method for enhancing off-track recovery of data that has become unreadable to a data storage device, the device having a read head presentable to a data track on a storage medium, the method comprising:

(a) recording a set of data on the data track;

(b) detecting instances of data recorded in step (a) becoming unreadable by the device due to the read head not tracking the data as recorded on the data track;

(c) performing selected off-track reads so as to recover the unreadable data detected in step (b), each off-track read performed at an off-track position in a spectrum thereof across the data track;

(d) for each off-track position in the spectrum, counting the number of times that data is recovered from that off-track-position during step (c);

(e) ranking off-track positions into a series corresponding to incidents of data recovery counted in step (d), the series in order of the off-track position having most incidents down to the off-track position having least incidents;

(f) embodying the series in a table;

(g) loading the table into firmware on the device; and (h) following the table in future off-track read attempts by the device to recover unreadable data.

2. The method of claim 1, further comprising:

(i) periodically updating the table.

3. The method of claim 1, in which step (d) includes the substep of:

accumulating for each of said off-track position counts the number of times that data is recovered at the corresponding off-track position either side of a data track centerline.

4. A method for enhancing off-track recovery of data that has become unreadable to a data storage device, the device having a read head presentable to a data track on a storage medium, the method comprising:

(a) calibrating selected off-track data recovery characteristics of the device so as to derive a statistical distribution of off-track positions in a spectrum thereof across the data track, the distribution indicating, for each off-track position therein, the likelihood that data will be recovered from that off-track position during off-track data recovery attempts in a control sample;

(b) ranking off-track positions into a series based on the distribution, the series in order of the off-track position most likely to recover data down to the off-track position least likely to recover data; and (c) following the series in future off-track read attempts by the device to recover unreadable data.

5. The method of claim 4, in which step (a) includes the substeps of:

(1) recording a set of data on the data track;

(2) detecting instances of data recorded in substep (a)(1) becoming unreadable by the device due to the read head not tracking the data as recorded on the data track;

(3) performing selected off-track reads from the data track so as to recover the unreadable data detected in substep (a)(2), each off-track read performed at an off-track position in a spectrum thereof across the data track; and (4) for each off-track position in the spectrum, counting the number of times that data is recovered from that off-track-position during step (a)(3).

6. The method of claim 4, in which step (c) includes the substeps of:

(1) embodying the series in a table;

(2) loading the table into firmware on the device.

7. The method of claim 4, further comprising:

(d) periodically updating the series.

8. The method of claim 4, in which the statistical distribution differentiates between individual off-track positions independent of position with respect to a data track centerline.

9. The method of claim 4, in which the distribution combines, for each off-track position, contributions from off-track positions located equidistant either side of a data track centerline.

10. The method of claim 4, in which the distribution is a histogram.

11. A method for enhancing off-track recovery of data that has become unreadable to a data storage device, the device having a read head presentable to a data track on a storage medium, the method comprising:

(a) calibrating selected off-track data recovery characteristics of the device so as to derive a histogram of off-track positions in a spectrum thereof across the data track, the histogram indicating, for each off-track position in the spectrum, the incidence of data recovery from that off-track-position during off-track data recovery attempts in a control sample;

(b) ranking off-track positions into a series based on the histogram, the series in order of the off-track position most likely to recover data down to the off-track position least likely to recover data;

(c) embodying the series in a table;

(d) loading the table into firmware on the device; and (e) following the table in future off-track read attempts by the device to recover unreadable data.

12. The method of claim 11, in which step (a) includes the substeps of:

(1) recording a set of data on the data track;

(2) detecting instances of data recorded in substep (a)(1) becoming unreadable by the device due to the read head not tracking the data as recorded on the data track;

(3) performing selected off-track reads from the data track so as to recover the unreadable data detected in substep (a)(2), each off-track read performed at an off-track position in a spectrum thereof across the data track; and (4) for each off-track position in the spectrum, counting the number of times that data is recovered from that off-track-position during step (a)(3).

13. The method of claim 11, further comprising:

(f) periodically updating the series.

14. The method of claim 11, in which the histogram differentiates between individual off-track positions independent of position with respect to a data track centerline.

15. The method of claim 11, in which the histogram shows, for each off-track position, the cumulative incidence of data recovery at that off-track position either side of a data track centerline.

16. The method of claim 4, in which step (a) includes the substeps of:

(1) recording a set of data on the data track;

(2) detecting instances of data recorded in substep (a)(1) becoming unreadable by the device due to the read head not tracking the data as recorded on the data track;

(3) performing selected off-track reads from the data track so as to recover the unreadable data detected in substep (a)(2), each off-track read performed at an off-track position in a spectrum thereof across the data track; and (4) calculating at least one approximate statistical moment of a series of off-track positions, wherein each off-track positions of said series corresponds to a recovery of data.

* * * * *